Figure 1:
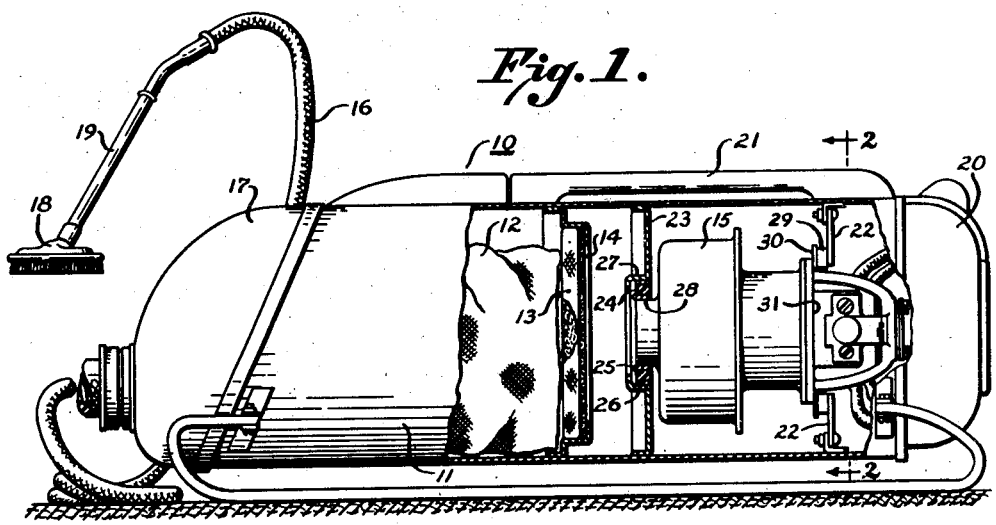

Feb. 1, 1949.     F. C. DOUGHMAN     2,460,682
MECHANICAL MOUNTING
Filed April 11, 1944

INVENTOR
Ferman C. Doughman
BY
Murray Robinson
ATTORNEY

UNITED STATES PATENT OFFICE

2,460,682

MECHANICAL MOUNTING

Ferman C. Doughman, Darien, Conn., assignor to Electrolux Corporation, Old Greenwich, Conn., a corporation of Delaware Application April 11, 1944, Serial No. 530,484

3 Claims. (Cl. 230—232)

The object of this invention is to provide an improved mounting for a piece of machinery such as a motor-fan unit. Such machinery is subject to vibration because of the unbalance of its moving parts. It is therefore desirable to isolate such machinery from its surroundings so that the vibrations will be transmitted thereto to as small a degree as possible.

In case machinery such as that above described is to be mounted in a portable device such as a vacuum cleaner, the mounting must serve the additional purpose of protecting the machinery from shocks incident to the movement and jarring of the supporting device. Under such circumstances the mounting must be, at one and the same time, elastic and yet strong enough to stand shocks.

In my prior application Ser. No. 346,242, filed July 19, 1940, now Patent Number 2,307,827, I have shown a mounting for a motor-fan unit used in vacuum cleaners. In that patent I disclosed a motor-fan unit supported by rubber sandwiches located about its periphery midway between its ends. This construction, while providing good vibration insulation did not provide as strong a support for the unit as might be desired, particularly against longitudinal shocks. A special stop construction was required to limit the longitudinal motion of the unit.

A mounting providing an inherently greater support against shocks and a simpler problem of assembly is shown in my later and copending application Ser. No. 403,625, filed July 23, 1941, now Patent Number 2,360,211 of October 10, 1944, of which this application is a continuation in part. In that application there is disclosed a motor-fan unit mounted between resilient rings placed over annular flanges at either end of the unit. This construction, however, does not provide as perfect vibration insulation as that disclosed in my aforementioned patent.

I have found that by utilizing a ring support similar to that shown in my copending application at one end of the motor-fan unit and a vertical sandwich support at the other end, a minimum of vibration is transmitted to the remainder of the vacuum cleaner and at the same time the unit is well protected against shocks. This is due in part to the fact that as far as torsional vibrations are concerned the rubber supports are only placed in shear permitting a maximum of movement while in the case of external shocks either longitudinal or perpendicular to the axis of the unit there is always a part of the rubber that must be compressed or put in direct tension.

Another advantage of the improved mounting lies in the fact that it is even more easily assembled than that shown in my copending application since the unit is not permanently connected to the end cover of the cleaner.

Figure 2:
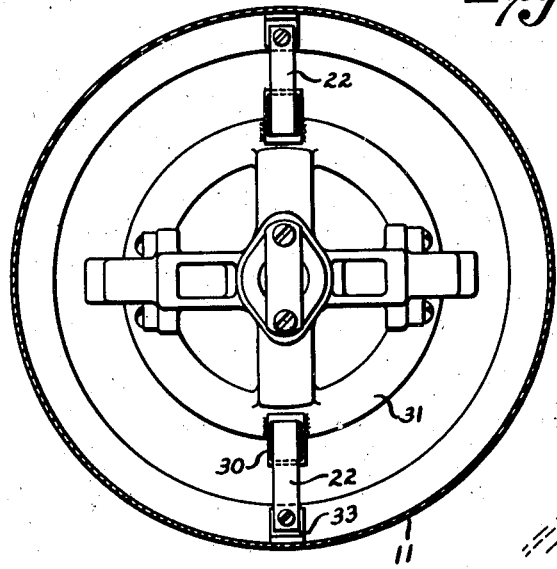
Figure 3:
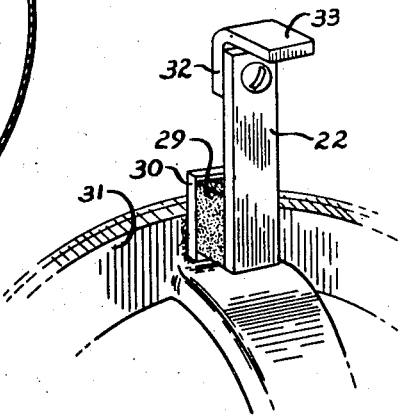

For a further disclosure of my invention reference will be made to the accompanying drawing in which, Fig. 1 is a side elevation, partly in section, of a vacuum cleaner embodying my invention;

Fig. 2 is a sectional view of the vacuum cleaner showing the sandwich supports at one end of the motor-fan unit, and Fig. 3 is a detail view of one of the sandwich supports.

Referring to the drawing, 10 designates generally a vacuum cleaner of the tank type comprising a cylindrical body 11 in which is mounted a dust bag 12, a filter pad 13, a wire screen 14, and a motor-fan unit 15. A hose 16 is connected to the removable cover 17 at one end of the body. A suitable cleaning tool 18 is connected to a hollow wand 19 which is connected to the other end of the hose. The opposite end of the tank is closed by a removable cover 20.

In operation the motor-fan unit draws air in through the tool. The air flow removes dirt and dust from the object being cleaned and carries it into the body of the cleaner where it is deposited and collected in the dust bag. The fine dust that may pass through the dust bag is removed from the air stream by the filter pad. As the tool is moved about, the size of opening for airflow changes, varying the load on the motor-fan unit. This produces torsional vibrations. If the unit were not insulated from the tank these vibrations would be amplified by the floor on which the cleaner rests.

When not in use the cleaner can be carried about by the handle 21. Occasionally during such handling and more often during shipping, the whole cleaner may be dropped from a considerable height. For this reason also it is necessary that the heavy and somewhat delicate motor-fan unit be supported in some sort of mounting serving as a shock absorber.

According to the present invention, the unit is supported in the tank by supporting members 22 and bulkhead 23. A rubber ring 24 vulcanized between steel rings 25 and 26, is interposed between flange 27 on the bulkhead and the cylindrical end 28 of the motor-fan unit. At the other end of the unit rubber pads 29 are vulcanized between the members 22 and metal strips 30 attached to the member 31 of the motor-fan unit.

The members 22 are bolted as at 32 to angle irons 33 which are affixed to the inside of the body.

Depending on the desired method of assembly either the ring 26 may be secured first to the flange 27 or the ring 25 may be secured to the end 28 or the whole assembly of rings 24, 25, and 26 may be assembled in position between flange 27 and end 28.

It will be seen from the above description that the ring 24 and pads 29 are placed in shear by torsional vibrations of the unit and that regardless of the direction in which the vacuum cleaner is jarred either the pads or the ring will be placed in tension or compression, thus providing a maximum of vibration insulation and a sturdy shock absorbing mounting.

The above description sets forth a preferred embodiment of the invention and it is obvious that modifications could be made without departing from the spirit of the invention. It is intended to cover by Letters Patent all forms of the invention falling within the scope of the appended claims.

What I claim is:

1. A vacuum cleaner body, a motor-fan unit, a bulkhead within the body, a rubber supporting ring placed over one end of the unit and affixed thereto, a flange on the bulkhead forming an annular opening supporting said ring, a plurality of rubber sandwiches affixed at one side to the other end of the unit and at the other side to the interior of the body, the planes of said sandwiches being perpendicular to the axis of the unit.

2. In a mounting for a motor-fan unit of a vacuum cleaner, the combination with a bulkhead having a circular opening therein, of a circular mounting member in said opening and receiving one end of a motor-fan unit and comprising a pair of circular members and a circular resilient member spacing said members apart, and a pair of diametrically opposed vertically aligned mounting members at the opposite end of the motor-fan unit each comprising a pair of elements spaced apart by resilient pads extending in a plane perpendicular to the axis of the motor-fan unit, one member of each pair being secured to the motor-fan unit while the other member of each pair is secured to the vacuum cleaner housing.

3. In a vacuum cleaner, a hollow body, a motor-fan unit within said body, a pair of longitudinally spaced supporting means affixed to the interior of said body for supporting said unit therein, a resilient ring having inner and outer circumferential surfaces, one of said surfaces being in supporting contact with one end of said unit and the other of said surfaces being in supported contact with one of said supporting means, and a plurality of resilient pads circumferentially disposed around said unit and affixed to the other end of the unit in a plane perpendicular to its axis and affixed in a like plane to the other of said supporting means.

FERMAN C. DOUGHMAN.

REFERENCES CITED

The following references are of record in the file of this patent:

UNITED STATES PATENTS

| Number | Name | Date |
| --- | --- | --- |
| 1,959,969 | Saurer | May 22, 1934 |
| 2,005,934 | Carter | June 25, 1935 |
| 2,132,450 | Wolf | Oct. 11, 1938 |
| 2,198,672 | Lee | Apr. 30, 1940 |
| 2,264,895 | Starr | Dec. 2, 1941 |
| 2,296,446 | Lampe | Sept. 22, 1942 |
| 2,349,215 | Wahlborg | May 16, 1944 |
| 2,378,874 | Trott | June 19, 1945 |